US012705174B2

(12) United States Patent
Jin et al.

(10) Patent No.: US 12,705,174 B2
(45) Date of Patent: Aug. 11, 2026

(54) APPARATUS AND METHOD FOR ADJUSTING CACHE ALLOCATED FOR READ LOOK AHEAD

(71) Applicant: SK hynix Inc., Gyeonggi-do (KR)

(72) Inventors: Byoung Min Jin, Gyeonggi-do (KR); Ku Ik Kwon, Gyeonggi-do (KR); Hyun Jin Chung, Gyeonggi-do (KR); Gyu Yeul Hong, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 19/063,303

(22) Filed: Feb. 26, 2025

(65) Prior Publication Data

US 2025/0217290 A1 Jul. 3, 2025

Related U.S. Application Data

(63) Continuation of application No. 18/361,907, filed on Jul. 31, 2023, now Pat. No. 12,271,313.

(30) Foreign Application Priority Data

Mar. 8, 2023 (KR) ........................ 10-2023-0030355

(51) Int. Cl.
*G06F 12/0806* (2016.01)

(52) U.S. Cl.
CPC ...... *G06F 12/0806* (2013.01); *G06F 2212/68* (2013.01)

(58) Field of Classification Search
None
See application file for complete search history.

(56) References Cited

FOREIGN PATENT DOCUMENTS

CN 106557431 B * 7/2020 ......... G06F 12/0866

* cited by examiner

*Primary Examiner* — Brian R Peugh
(74) *Attorney, Agent, or Firm* — IP&T GROUP LLP

(57) ABSTRACT

A controller includes at least one register configured to store a doorbell regarding a submission queue storing at least one request generated by a host, a first cache configured to store data corresponding to a first result of an operation performed in response to the at least one request, a second cache configured to store data corresponding to a second result of an operation performed in response to a read look ahead (RLA) request generated based on the at least one request, and a cache size manager configured to adjust a size of the second cache based on an update cycle of the doorbell and a change of a number of the at least one request corresponding to the doorbell.

27 Claims, 6 Drawing Sheets

FIG. 3

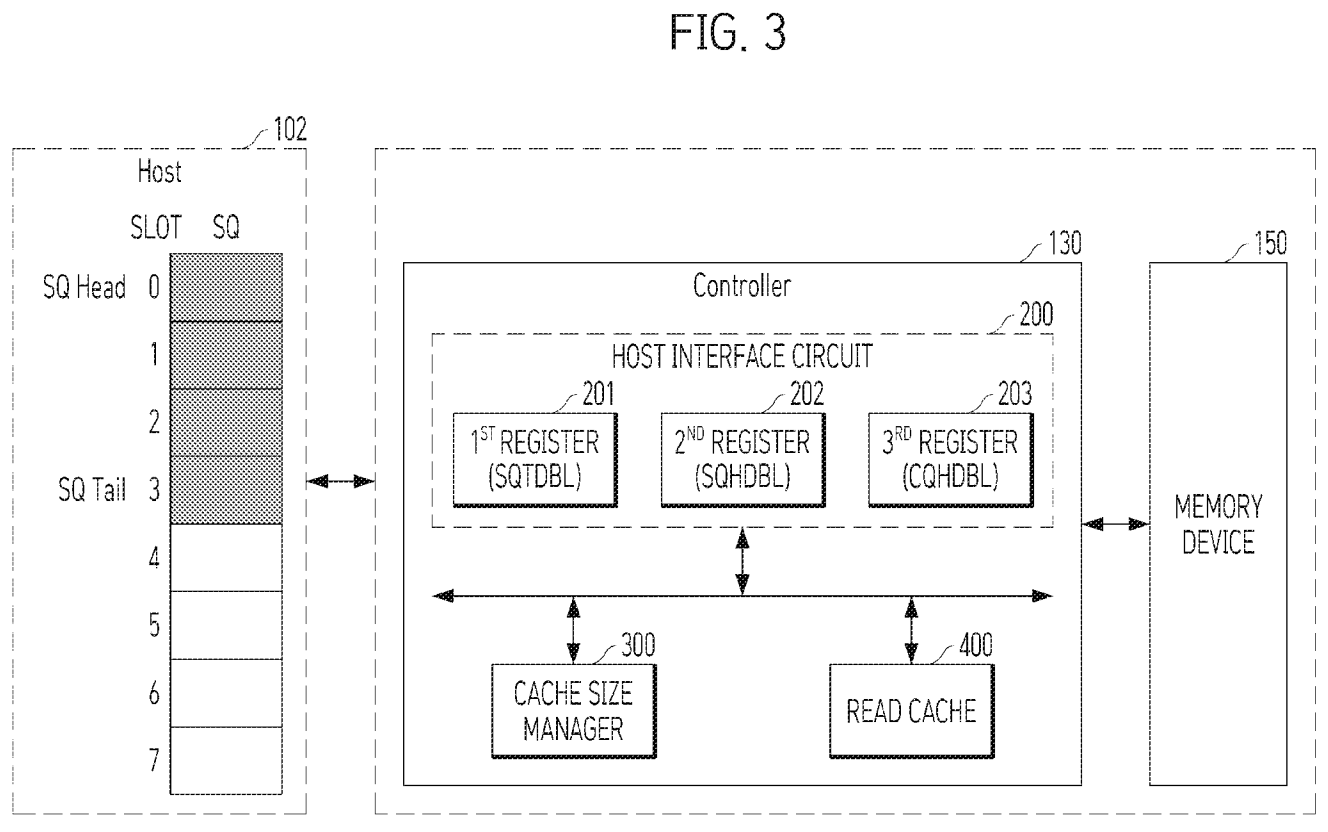

150
MEMORY DEVICE

130
Controller

200
HOST INTERFACE CIRCUIT 201
1ST REGISTER (SQTDBL)

202
2ND REGISTER (SQHDBL)

203
3RD REGISTER (CQHDBL)

300
CACHE SIZE MANAGER

400
READ CACHE

102
Host

SLOT SQ
0 1 2 3 4 5 6 7

SQ Head
SQ Tail

APPARATUS AND METHOD FOR ADJUSTING CACHE ALLOCATED FOR READ LOOK AHEAD

CROSS-REFERENCE TO RELATED APPLICATIONS

This application is a continuation of U.S. patent application Ser. No. 18/361,907 filed on Jul. 31, 2023, now U.S. Pat. No. 12,271,313 which claims the benefit of priority under 35 U.S.C. § 119(a) to Korean Patent Application No. 10-2023-0030355, filed on Mar. 8, 2023, the entire disclosure of which is incorporated herein by reference.

TECHNICAL FIELD

One or more embodiments of the present disclosure described herein relate to a data processing system, and more particularly, to an apparatus and a method for adjusting a size of cache allocated for read look ahead (RLA) performed within a data processing system or a memory system included in the data processing system.

BACKGROUND

A memory system is a device that stores data based on a request input from a host such as a computer, a mobile terminal such as a smart phone or tablet, or various electronic devices. The memory system may include a controller configured to control a memory device (e.g., a volatile memory/non-volatile memory). The controller can perform or control operations for reading, writing, or erasing data within the memory device. Further, the controller can drive firmware to perform logic operations to execute or control the operations. The controller may pre-fetch data stored in the memory device in a cache in order to more quickly perform a read operation requested by the host. In this case, the memory system may pre-fetch read data requested by the host in the cache, but may also pre-fetch data in the cache in advance before the host transmits a read command and an associated address to the memory system.

BRIEF DESCRIPTION OF THE DRAWINGS

The description herein makes reference to the accompanying drawings wherein like reference numerals refer to like parts throughout the figures.

FIG. 3 illustrates a schematic structure of a memory system and a host according to an embodiment of the present disclosure.

DETAILED DESCRIPTION

Figure 1:
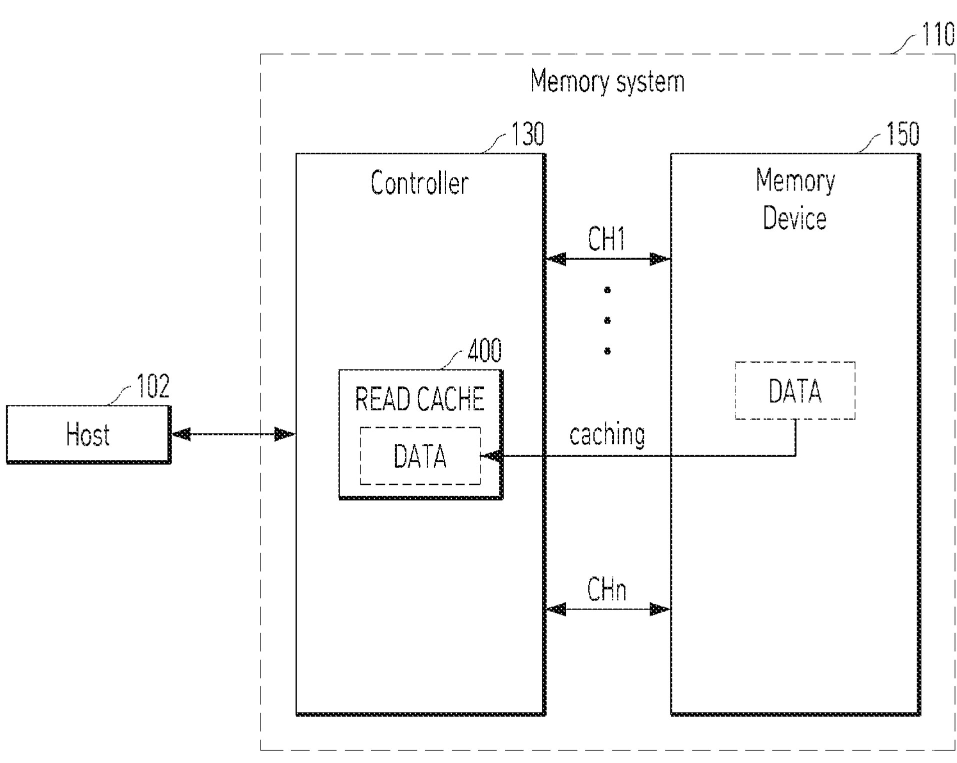
FIG. 1 illustrates a schematic structure of a memory system for showing read look ahead (RLA) according to an embodiment of the present disclosure.

Various embodiments of the present disclosure are described below with reference to the accompanying drawings. Elements and features of this disclosure, however, may be configured or arranged differently to form other embodiments, which may be variations of any of the disclosed embodiments.

In this disclosure, references to various features (e.g., elements, structures, modules, components, steps, operations, characteristics, etc.) included in "one embodiment," "example embodiment," "an embodiment," "another embodiment," "some embodiments," "various embodiments," "other embodiments," "alternative embodiment," and the like are intended to mean that any such features are included in one or more embodiments of the present disclosure, but may or may not necessarily be combined in the same embodiments.

In this disclosure, the terms "comprise," "comprising," "include," and "including" are open-ended. As used in the appended claims, these terms specify the presence of the stated elements and do not preclude the presence or addition of one or more other elements. The terms in a claim do not foreclose the apparatus from including additional components e.g., an interface unit, circuitry, etc.

In this disclosure, various units, circuits, or other components may be described or claimed as "configured to" perform a task or tasks. In such contexts, "configured to" is used to connote structure by indicating that the blocks/units/circuits/components include structure (e.g., circuitry) that performs one or more tasks during operation. As such, the block/unit/circuit/component can be said to be configured to perform the task even when the specified block/unit/circuit/component is not currently operational, e.g., is not turned on nor activated. Examples of block/unit/circuit/component used with the "configured to" language include hardware, circuits, memory storing program instructions executable to implement the operation, etc. Additionally, "configured to" can include a generic structure, e.g., generic circuitry, that is manipulated by software and/or firmware, e.g., an FPGA or a general-purpose processor executing software to operate in a manner that is capable of performing the task(s) at issue. "Configured to" may also include adapting a manufacturing process, e.g., a semiconductor fabrication facility, to fabricate devices, e.g., integrated circuits that are adapted to implement or perform one or more tasks.

As used in this disclosure, the term 'machine,' 'circuitry' or 'logic' refers to all of the following: (a) hardware-only circuit implementations such as implementations in only analog and/or digital circuitry and (b) combinations of circuits and software and/or firmware, such as (as applicable): (i) to a combination of processor(s) or (ii) to portions of processor(s)/software including digital signal processor(s), software, and memory(ies) that work together to cause an apparatus, such as a mobile phone or server, to perform various functions and (c) circuits, such as a microprocessor(s) or a portion of a microprocessor(s), that require software or firmware for operation, even if the software or firmware is not physically present. This definition of 'machine,' 'circuitry' or 'logic' applies to all uses of these terms in this application, including in any claims. As a further example, as used in this application, the term 'machine,' 'circuitry' or 'logic' also covers an implementation of merely a processor or multiple processors or portion of a processor and its (or their) accompanying software and/or firmware. The term 'machine,' 'circuitry' or 'logic' also covers, for example, and if applicable to a particular claim element, an integrated circuit for a storage device.

As used herein, the terms 'first,' 'second,' 'third,' and so on are used as labels for nouns that they precede, and do not imply any type of ordering, e.g., spatial, temporal, logical, etc. The terms 'first' and 'second' do not necessarily imply that the first value must be written before the second value. Further, although the terms may be used herein to identify various elements, these elements are not limited by these terms. These terms are used to distinguish one element from another element that otherwise have the same or similar names. For example, a first circuitry may be distinguished from a second circuitry.

Further, the term 'based on' is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

An embodiment of the present invention can provide an apparatus or a method for changing or adjusting a size of cache allocated for a read look ahead (RLA) operation based on a change in an update period or cycle of a submission queue tail pointer, transmitted from a host, or a difference between a submission queue head pointer and the submission queue tail pointer.

An embodiment of the present invention can provide a device or an operation method included in a memory system which is configured to compare a request associated with a data input/output operation, input from the host, with I/O performance or throughput of the memory system, change a size of cache allocated for the read look ahead (RLA) operation, and adjust throughput of the read look ahead (RLA) operation or I/O throughput based on a changed size of cache.

In an embodiment of the present invention, a controller can include at least one register configured to store a doorbell regarding a submission queue storing at least one request generated by a host; a first cache configured to store data corresponding to a first result of an operation performed in response to the at least one request; a second cache configured to store data corresponding to a second result of an operation performed in response to a read look ahead (RLA) request generated based on the at least one request; and a cache size manager configured to adjust a size of the second cache based on an update cycle of the doorbell and a change of a number of the at least one request corresponding to the doorbell.

The at least one register can include a first register configured to store a submission queue tail doorbell; a second register configured to store a submission queue head doorbell; and a third register configured to store a completion queue head doorbell.

The cache size manager can adjust the size of the second cache by comparing a reference time and an update cycle of the submission queue tail doorbell to check read operation performance to determine whether to increase or decrease the size of the second cache, calculating a first size of differential data based on a difference between the reference time and the update cycle, and changing the size of the second cache to a first size value of the second cache based on the first size of the differential data.

The reference time can be determined based on a command generation cycle corresponding to a size of the first cache. The size of the first cache can be determined based on a ratio of an amount of data requested by the host and an amount of data output to the host.

The cache size manager can determine to increase the size of the second cache when the update cycle of the submission queue tail doorbell is less than the reference time. The cache size manager can change the size of the second cache to the first size value by increasing the size of the second cache by a predetermined value corresponding to the first size of the differential data.

The cache size manager can determine to decrease the size of the second cache when the update cycle of the submission queue tail doorbell is greater than the reference time. The cache size manager can change the size of the second cache to the first size value by decreasing the size of the second cache by a predetermined value corresponding to the first size of the differential data.

The cache size manager can adjust the size of the second cache by determining whether to increase or decrease the size of the second cache based on a change in a current difference and a previous difference between head and tail pointers of the submission queue; calculating a second size of the differential data based on the change in the current difference and the previous difference; and changing the size of the second cache to a second size value based on the second size of the differential data.

The cache size manager can determine to increase the size of the second cache when the current difference is greater than the previous difference. The cache size manager can change the size of the second cache from the first size value to the second size value by calculating the second size of the differential data based on the number of pending commands corresponding to the change in the current difference and the previous difference, increasing the size of the second cache from the first size value to the second size value by a predetermined value corresponding to the second size of the differential data.

The cache size manager can determine to decrease the size of the second cache when the previous difference is less than the current difference. The cache size manager can change the size of the second cache from the first size value to the second size value by calculating a size of the differential data based on the number of pending commands corresponding to the change in the current difference and the previous difference, decreasing the size of the second cache from the first size value to the second size value by a predetermined value corresponding the second size of the differential data.

The cache size manager can adjust the size of the second cache further by checking whether the second size value of the second cache exceeds a maximum size of the second cache.

The cache size manager can adjust the size of the second cache further by allowing the second size value of the second cache when the second size value is equal to, or less than, the maximum size; and converting at least a part of the second cache to the first cache when the second size value is greater than the maximum size.

In another embodiment, a method for operating a memory system can include storing a doorbell regarding a submission queue storing at least one request generated by a host; storing data corresponding to a first result of a first operation performed in response to the at least one request, and storing data corresponding to a second result of a second operation performed in response to a read look ahead (RLA) request generated based on the at least one request; adjusting a size of the second cache based on an update cycle of the doorbell and a change of a number of the at least one request corresponding to the doorbell; and determining an operation speed or a throughput regarding RLA request based on the size of the second cache.

The storing of the doorbell can include storing a submission queue tail doorbell; storing a submission queue head doorbell; and storing a completion queue head doorbell.

The adjusting the size of the second cache can include calculating a first size value based on an update cycle of the submission queue tail doorbell; calculating a second size value based on a change in a current difference and a previous difference between head and tail pointers of the submission queue during the update cycle; and changing the size of the second cache with the second size value when the second size value is equal to, or less than, a maximum size of the second cache.

The calculating the first size value can include comparing a reference time and the update cycle of the submission queue tail doorbell to determine whether to increase or decrease the size of the second cache; calculating a first size of differential data based on a difference between the reference time and the update cycle; and changing the size of the second cache to the first size value based on the first size of the differential data.

The reference time can be determined based on a command generation cycle corresponding to a size of the first cache. The size of the first cache can be determined based on a ratio of an amount of data requested by the host and an amount of data output to the host.

The comparing the reference time and the update cycle can include determining to increase the size of the second cache when the update cycle of the submission queue tail doorbell is less than the reference time. The changing of the size of the second cache can include increasing the size of the second cache by a predetermined value corresponding to the first size of the differential data The comparing the reference time and the update cycle can include determining to decrease the size of the second cache when the update cycle of the submission queue tail doorbell is greater than the reference time. The changing the size of the second cache can include decreasing the size of the second cache by a predetermined value corresponding to the first size of the differential data.

The calculating the second size value can include determining whether to increase or decrease the size of the second cache based on a change in a current difference and a previous difference between head and tail pointers of the submission queue; calculating a second size of the differential data based on the change in the current difference and the previous difference; and changing the size of the second cache from the first size value to a second size value based on the second size of the differential data.

The determining whether to increase or decrease the size of the second cache can include determining to increase the size of the second cache when the current difference is greater than the previous difference. The changing the size of the second cache from the first size value to the second size value can include: calculating the second size of the differential data according to a number of pending commands corresponding to the change in the current difference and the previous difference, and increasing the size of the second cache from the first value to the second value by a predetermined value corresponding to the second size of differential data.

The determining whether to increase or decrease the size of the second cache can include determining to decrease the size of the second cache when the current difference is less than the previous difference. The changing the size of the second cache from the first size value to the second size value can include: calculating the second size of the differential data according to a number of pending commands corresponding to the change in the current difference and the previous difference, and decreasing the size of the second cache from the first value to the second value by a predetermined value corresponding to the second size of differential data.

The adjusting can further include converting at least a part of the second cache to the first cache when the second size value is greater than the maximum size.

In another embodiment, a memory system can include at least one processor and at least one memory having stored instructions operative, when executed by the at least one processor, to cause the memory system to: perform a read look ahead (RLA) operation determined based on an estimated pattern of at least one request input from a host; adjust a size of a cache, included in the at least one memory, storing first data obtained through the RLA operation based on a doorbell regarding a submission queue of the host; and change a throughput of the RLA operation based on the adjusted size of the cache.

The cache can include a first cache configured to store the first data; and a second cache configured to store second data obtained from a read operation performed in response to a read request input from the host.

The first cache can have a preset maximum size. When a size of the first cache exceeds the preset maximum size, the size of the first cache can be increased by a reduced size of the second cache.

The memory system can further include at least one register configured to store the doorbell regarding the submission queue; and a logic configured to determine an increase or a decrease in reception amount of the at least one request input from the host or in an I/O throughput of the memory system.

The at least one register can include a first register configured to store a submission queue tail doorbell; a second register configured to store a submission queue head doorbell; and a third register configured to store a completion queue head doorbell.

Embodiments will now be described with reference to the accompanying drawings, wherein like numbers reference like elements.

FIG. 1 illustrates a schematic structure of a memory system 110 for showing read look ahead (RLA) according to an embodiment of the present disclosure.

Referring to FIG. 1, the memory system 110 can include a memory device 150 and a controller 120.

The memory device 150 can include a plurality of semi-conductor memories. The plurality of semi-conductor memories can be divided into a plurality of groups. The plurality of groups can communicate with the controller 130 through first to nth channels CH1 to CHn. Each of the plurality of groups can be configured to communicate with the controller 130 through a single channel which could be commonly shared by another group. The controller 130 can be configured to control the plurality of semi-conductor memories included in the memory device 150 through the plurality of channels CH1 to CHn.

The controller 130 can include a read cache 400. The read cache 400 is one of cache memories which are used to improve memory system performance by reducing the time it takes to retrieve frequently accessed data or instructions.

The controller 130 may read data from the read cache 400 instead of reading data from the memory device 150 in order to quickly carry out a read operation requested by the host 102. That is, the controller 130 may read cached data if the corresponding data has been already cached, i.e., pre-fetched, in the read cache 400. On the other hand, if data corresponding to the read request is not cached, not pre-fetched, in the read cache 400, the data should be read and loaded from the memory device 150, temporarily stored in the read cache 400 or buffer, and then transmitted to the host 102.

The controller 130 can perform a RLA operation. The RLA operation is performed to improve performance of accessing a storage device (e.g., input/output (I/O) throughput) such as the memory system 110 included in a data processing system or a computing system. According to the RLA scheme, the memory system 110 may pre-fetch data from the memory device 150 into a cache or buffer even without the request from the host 102 and the memory system 110 may deliver the pre-fetched data to the host 102 when the host 102 needs it. The RLA operation can be performed by estimating or predicting a data memory block or a data region, which is highly likely to be subsequently accessed, based on a current access pattern. For example, if the host 102 reads a file sequentially, the RLA mechanism can be used to bring, into the cache or the buffer, data from the next few blocks of the file by anticipating that host 102 will need them soon. The RLA operation can have several advantages in reducing data access time, reducing I/O latency, and improving overall system performance. If the number of times data is transferred or moved between the controller 130 and the memory device 150 is reduced and the possibility that data is pre-fetched in the cache or the buffer when the host 102 requests the data is increased, the I/O throughput of the memory system 110 could be increased through the RLA operation.

Through the RLA operation, the controller 130 may pre-fetch data for which the host 102 has not yet requested a read. Although the host 102 has not yet requested a read for data stored corresponding to a specific address, the controller 130 can determine that the host 102 is likely to request a read for the data stored corresponding to the specific address soon based on a read request pattern. That is, the controller 130 can pre-fetch data in the read cache 400 even without a read request for the data from the host 102. For example, the controller 130 may perform the RLA operation when at least one read request of the host 102 shows a sequential read pattern. As an example, a case in which the host 102 transmits a sequential read request to the memory system 110 will be described. When the host 102 requests a read for data corresponding to the first logical address LBA1 to the third logical address LBA3, the controller 130 can analyze a relationship or correlation about the first logical address LBA1 to the third logical address LBA3 to check or determine whether a RLA operation for other data needs to be performed. That is, because the first logical address LBA1 to the third logical address LBA3 are sequentially transmitted, the controller 130 can determine that data stored corresponding to the fourth logical address LBA4 is highly likely to be requested soon by the host 102. Therefore, the controller 130 can pre-fetch the data corresponding to the fourth logical address LBA4 before the host 102 transmit a read request for data corresponding to the fourth logical address LBA4, and store pre-fetched data in the read cache 400.

The controller 130 can pre-fetch in advance data that the host 102 is likely to request for a read and store pre-fetched data in the read cache 400, so that, when the host 102 requests the pre-fetched data, the corresponding data might not have to be transferred from the memory device 150. The corresponding data pre-fetched and stored in the read cache 400 can be transmitted to the host 102 without access to the memory device 150, thereby shortening a response time of the memory system 110. That is, the controller 130 could more quickly carry out an operation corresponding to a read request for data stored in the corresponding address.

However, if the host 102 does not request a read for data pre-fetched in the read cache 400 through the RLA operation, the controller 130 may spend resources to perform an unnecessary pre-fetch operation. In addition, when data for which the host 102 has not requested a read is stored in the read cache 400, a read operation can be performed in response to a read request from the host 102. Because the read cache 400 stores the data for which the host has not requested a read, the controller 130 might perform an operation to search for (e.g., extract) data which frequently occurs in the read cache 400 and, thus, performance of processing a read request of the host 102 might be deteriorated. For example, a cache hit probability can be increased when the host 102 makes a sequential read request rather than a random read request. Further, because the number of read operations of reading data from the memory device 150 increases, a lifespan of the memory device 150 may be shortened. Accordingly, the controller 130 could perform a RLA operation when it is determined that a read request input from the host 102 can be more efficiently processed. That is, if the controller 130 controls the RLA operation by changing a size of a cache allocated for the RLA operation according to a command generation speed of the host 102, the controller 130 can efficiently cope with the request input from the host. The controller 130 can determine the size of the cache allocated for the RLA operation in response to an update cycle of a tail doorbell regarding a submission queue and transmitted from the host 102 and/or the change in a difference between head and tail pointers of the submission queue. By changing the size of the cache for the RLA operation, it is possible to optimize the RLA operation according to the command generation speed of the host 102. Depending on an embodiment, the controller 130 may change a throughput of the RLA operation based on a changed size of the cache.

In a data processing system or a computing system including the host 102 and the memory system 110 shown in FIG. 1, a doorbell may be update information or an update notification that can include hardware mechanisms, which are used to transfer a signal or a message between components within the data processing system or the computing system when an event such as job completion or data reception occurs. In order to send a signal such as the doorbell, a specific component in the computing system can record a predetermined value (e.g., an integer value corresponding to an event associated with a signal) in a corresponding register or at a specific location in a memory. Another component corresponding to the specific component can read the recorded value in the corresponding register or at the specific location of the memory to check the event corresponding to the recorded value. Depending on an embodiment, the host 102 can store a command or a request related to a data input/output operation to be transmitted to the memory system 110 at a specific location and record a doorbell corresponding to an event regarding the command or the request. The memory system 110 can check the doorbell to recognize the event regarding the command or the request issued by the host 102. In another embodiment, data communication between the host 102 and the memory system 110 can be performed through a doorbell regarding a data input/output operation performed and completed by the memory system 110. A doorbell mechanism can simplify the design of the data processing system or the computing system and reduce the need for a communication method such as polling to improve performance of the data processing system or the computing system.

Figure 2:
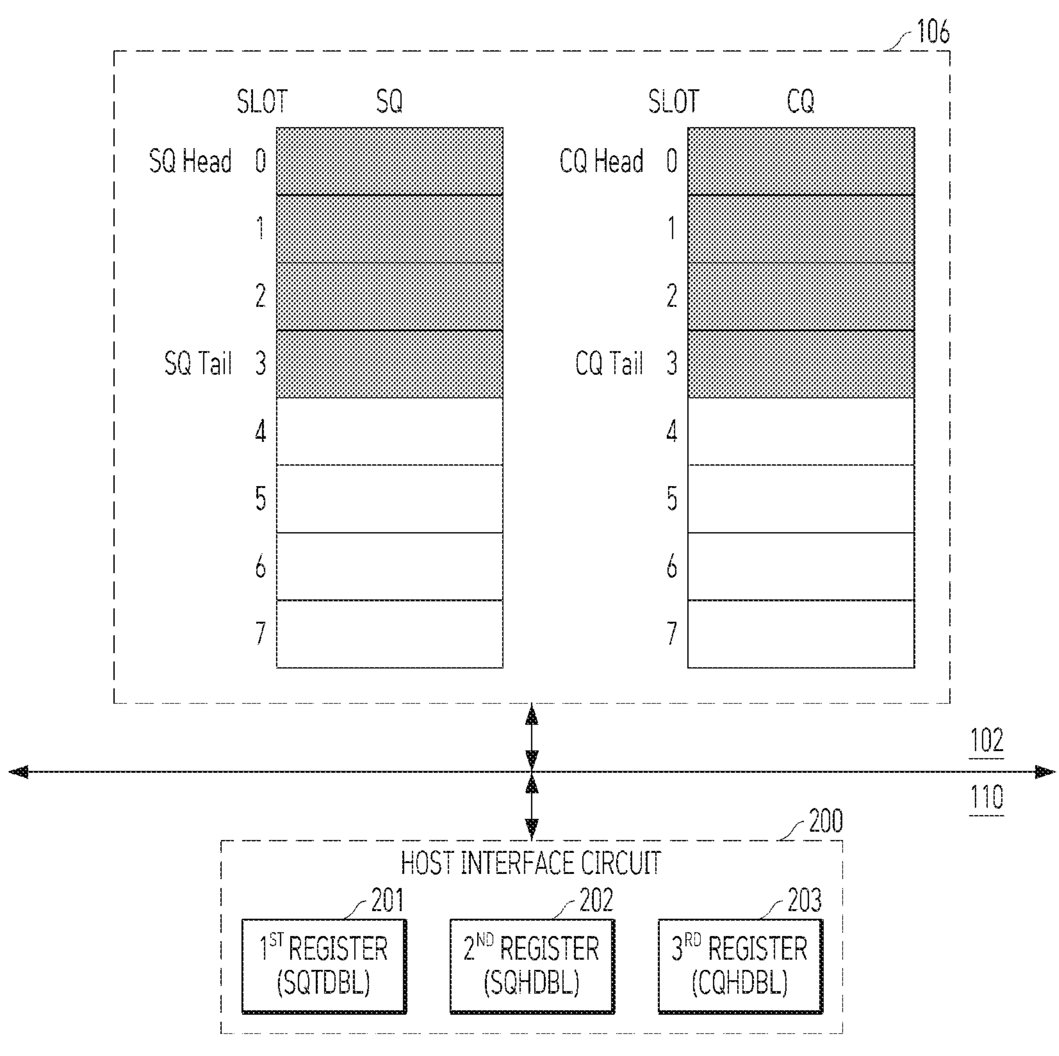
FIG. 2 illustrates a communication between a host and a memory system according to an embodiment of the present disclosure.

FIG. 2 illustrates a communication between the host 102 and the memory system 110 according to an embodiment of the present disclosure.

Referring to FIGS. 1 and 2, the host 102 may include a host memory 106. The host memory 106 can include a submission queue SQ configured to manage requests or commands to be transmitted to the memory system 110 and a completion queue CQ configured to manage completion information regarding transmitted requests or commands. In an embodiment, the host 102 can establish plural queues SQ, CQ in the host memory 106. As an example, the submission queue may include N submission queues SQ1 to SQN, and the completion queue may include N completion queues CQ1 to CQN. A controller of the host memory 106 may manage the N submission queues SQ1 to SQN and the N completion queues CQ1 to CON. Here, the 'N' may be determined based on various criteria. For example, the 'N' may be arbitrarily designated by the host 102 or be determined according to the capability of the memory system 100 (e.g., the number of cores that can be simultaneously executed). Further, N queue pairs may be configured based on the N submission queues SQ1 to SQN and the N completion queues CQ1 to CON. For example, one of the N submission queues SQ1 to SQN and one of the N completion queues CQ1 to CON may constitute one queue pair. An execution result of a command stored in a submission queue SQ may be stored in a completion queue CQ corresponding the submission queue SQ which constitutes a same queue pair. In another embodiment, based on a memory-based transmission model, plural queues among the N submission queues SQ1 to SQN and a single queue among the N completion queues CQ1 to CON may be configured as one queue pair. It could be possible that a single worker thread can handle completion regarding plural commands through a single completion queue, even when the plural commands started from plural submission queues. Further, the N submission queues SQ1 to SQN and the N completion queues CQ1 to CON may be implemented as a circular queue or a linear queue, for example. In FIG. 2, the N is set to 1 for convenience of description, and a case in which the submission queue SQ and the completion queue CQ are linear queues is shown as an example.

Each of the submission queue SQ and the completion queue CQ may have a head pointer HP and a tail pointer TP. The head and tail pointers HP and TP may be pointers indicating positions of specific elements or slots in each of the submission queue SQ and completion queue CQ. Positions of the head pointer HP or tail pointer TP may be changed according to input and output (e.g., addition and release) of commands and completion information to and from the submission queue SQ and the completion queue CQ.

The submission queue SQ is a queue including submission entries written by the host 102. The submission entries may correspond to commands to be transmitted to the memory system 110. The submission entries in the submission queue SQ may be input, written or added by the host 102 and may be fetched or consumed by the memory system 110. The tail pointer TP of the submission queue SQ may be changed whenever the host 102 writes a new submission entry to the submission queue SQ, and the position of the changed tail pointer TP recorded by the host 102 may be transmitted to the memory system 110. In order to inform the memory system 110 that a new command has been written to the submission queue SQ, the host 102 can send to the memory system 110 a submission queue tail doorbell SQTDBL including a location of the changed tail pointer TP. The Head Pointer HP of the submission queue SQ can be updated after the memory system 110 transfers or adds, to the completion queue CQ in the host 102, completion information (hereinafter, a completion entry) corresponding the command fetched from the host 102.

The completion queue CQ is a queue including completion entries written by the memory system 110. The completion entries may indicate completion information of a command requested by the host 102. The completion entry in the completion queue CQ may be written or supplied by the memory system 110 and processed or consumed by the host 102. The tail pointer TP of the completion queue CQ may be updated by the memory system 110. The host 102 can advance (e.g., change) the head pointer HP of the completion queue CQ in response to an interrupt transmitted from the memory system 110, and a location regarding a new head pointer HP may be transmitted to the memory system 110 by the host 102. That is, the host 102 may receive an interrupt from the memory system 110 and process the completion entry in the completion queue CQ. The host 102 can transfer a completion queue head doorbell CQHDBL to the memory system 110 to inform the memory system 110 that the completion entry has been processed.

The memory system 110 may include host interface circuitry 200 capable of communicating with the host 102. In an example, the host interface circuitry 200 may include a first register 201 configured to store the submission queue tail doorbell SQTDBL of the host 102. The host interface circuit 200 may include a second register 202 configured to store the submission queue head doorbell SQHDBL of the host 102. Here, the submission queue head doorbell SQHDBL is information representing a location of a slot in which a command most recently fetched from the submission queue SQ of the host 102 to the memory system 110 is stored. The host interface circuit 200 may include a third register 203 configured to store the completion queue head doorbell CQHDBL of the host 102. The first register 201 and the second register 202 may store information regarding the submission queue SQ of the host 102, while the third register 203 may store information regarding the completion queue CQ of the host 102. The submission queue tail doorbell SQTDBL may include a value corresponding to the tail pointer of the submission queue SQ, the submission queue head doorbell SQHDBL may include a value corresponding to the head pointer of the submission queue SQ, and the completion queue head doorbell CQHDBL may include a value corresponding to the head pointer of the completion queue CQ.

Specifically, the memory system 110 can update the first register 201 when receiving the submission queue tail doorbell SQTDBL from the host 102. Then, the memory system 110 can check the submission queue tail doorbell SQTDBL stored in the first register 201 and the submission queue head doorbell SQHDBL stored in the second register 202, and then sequentially fetch commands (SQ entries) in a sequence from the submission queue head SQ Head to the submission queue tail SQ Tail. In an embodiment, it is described that the memory system 110 has been fetching commands from the submission queue head SQ Head to the submission queue tail SQ Tail. However, at least some commands stored up to the tail of the submission queue SQ might not be fetched based on performance of the memory system 110.

The memory system 110 may perform one or more operations corresponding to one or more fetched commands (e.g., process the one or more fetched commands). For example, if the fetched command is a write command, the memory system 110 may store data provided by the host 102 in the memory device 150 (see FIG. 1). For example, if the fetched command is a read command, the memory system 110 may read data requested by the host 102 from the memory device 150 (see FIG. 1). Moreover, commands stored in the submission queue SQ may or may not be processed in an order in which the commands are fetched by the memory system 110.

The memory system 110 may write a completion entry in the completion queue of the host 102 to notify completion of a command fetched from the submission queue SQ. The completion entry can include a Submission Queue Identifier (SQID), a Submission Queue Head Pointer (SQHD), a Status Field (SF), a Phase Tag (P), a Command Identifier (CID), etc. The memory system 110 may generate an interrupt and transmit the interrupt to the host 102. The interrupt may be a pin-based signal. In an embodiment, the interrupt may be transmitted in a message signaled interrupt (MSI) or MSI-X method. The memory system 110 may update the third register 203 storing the completion queue head doorbell CQHDBL received from the host 102.

In an embodiment of the present invention, the memory system 110 can change a size of an RLA cache by determining a generation speed of the command based on an update cycle of the tail doorbell SQTDBL regarding the submission queue SQ and the change in a difference between the head doorbell SQHDBL and the tail doorbell SQTDBL of the submission queue SQ. How to change the size of the RLA cache is described hereinafter.

FIG. 3 illustrates a schematic structure of a memory system and a host according to an embodiment of the present disclosure.

Referring to FIG. 3, the memory system 110 may include the controller 130 and the memory device 150. The controller 130 may include the host interface circuit 200, a cache size manager 300, and a read cache 400.

The read cache 400 may temporarily store data read and obtained from the memory device 150. For example, the read cache 400 may be a working memory. The working memory may store firmware, program codes, commands, or data required to drive the memory controller 130. Such a working memory is, for example, a volatile memory, and may include one or more of a static RAM (SRAM), a dynamic RAM (DRAM), and a synchronous DRAM (SDRAM). As another example, the read cache 400 may be a separate volatile memory (e.g., SRAM, DRAM, SDRAM) coupled to the controller 130. The controller 130 can be separated from the working memory. The read cache 400 will be described in detail with reference to FIG. 4.

Figure 4:
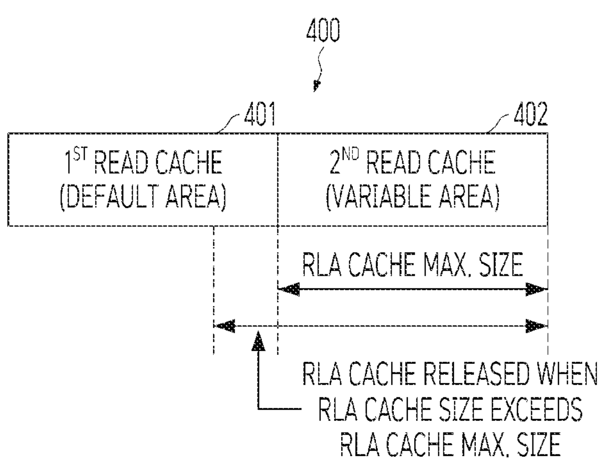
FIG. 4 illustrates configuration of a read cache shown in FIG. 3.

FIG. 4 illustrates configuration of the read cache 400 shown in FIG. 3.

Referring to FIG. 4, the read cache 400 may include a first read cache 401 and a second read cache 402. The first lead cache 401 may be a default cache, and the second lead cache 402 may be a variable cache. Data read from the memory device 150 may be stored in the first read cache 401 or the second read cache 402, and stored data may be output to the host 102. In addition, the size of the first read cache 401 is initially set to a default size, and the size of the second read cache 402 is variable based on read performance of the memory system 110.

The second read cache 402 operates as an RLA cache to store therein data read from the memory device 130 through the RLA operation. The size of the RLA cache can be adjusted within the size of the second read cache 402. The RLA cache may operate during the RLA operation. That is, when read operations responsive to read commands are not performed maximally, at least some of the second read cache 402 may be allocated as the RLA cache for storing therein data pre-fetched from the memory device 150 shown in FIG. 1. In an embodiment, the size of the RLA cache may be adjusted based on a size of data per unit time, the data corresponding to a request generated by the host 102.

Returning to FIG. 3, the host interface circuit 200 may update the first register 220 after receiving update information regarding a command issued from the host 102. Here, the update information is a type of message used to notify that the host 102 has generated a command to be transmitted to the memory system 110. The update information may include the submission queue tail doorbell SQTDBL. When receiving the submission queue tail doorbell SQTDBL from the host 102, the host interface circuit 200 can change a previous submission queue tail doorbell SQTDBL stored in the first register 220 to the latest submission queue tail doorbell SQTDBL. The host interface circuit 200 can generate submission queue tail doorbell change information SQTDBL_INF of the first register 220 and output the submission queue tail doorbell change information SQTDBL_INF to the cache size manager 300.

When the cache size manager 300 receives the submission queue tail doorbell change information SQTDBL_INF of the first register 220 from the host interface circuit 200, the cache size manager 300 may adjust the size of the RLA cache based on an update cycle (t') of the submission queue tail doorbell SQTDBL of the first register 201 or a difference between the submission queue tail doorbell SQTDBL of the first register 201 and the submission queue head doorbell SQHDBL of the second register 202.

First, the cache size manager 300 can calculate an RLA cache size value based on a difference between the update cycle (t') of the submission queue tail doorbell SQTDBL stored in the first register 201 and a reference time (t). Here, the reference time (t) can be determined based on a command generation interval corresponding to operational capability of the memory system 110. The operational capability of the memory system 110 can correlate with I/O throughput of the memory system 110, as well as a size of the read cache 400. The size of the read cache 400 can be set based on read operation performance of the memory system 110. The read operation performance can be determined based on a ratio a size of data requested from the host 102 and a size of data output to the host 102. For example, when an RLA operation is first enabled, a ratio between a size of data corresponding to commands requested from the host 102 for a unit time and a size of data output to the host 102 for the unit time can become '1.' At that time, the sizes of the first read cache 401 and the second read cache 402 in the read cache 400 may be initially set. In another example, the reference time (t) can be determined by calculating a command generation speed to which the size of the read cache 400 can correspond. That is, if commands are generated by the host 102 at intervals equal to the reference time (t), it may mean that a current size of the read cache 400 is appropriate for a current situation (e.g., it may be unnecessary to change or adjust the size of the read cache).

The cache size manager 300 can compare the update cycle (t') of the submission queue tail doorbell SQTDBL with the reference time (t). As a result, when the update cycle (t') of the submission queue tail doorbell SQTDBL is less than the reference time (t) (i.e., $t'<t$), it may be recognized that the size of data requested from the host 102 is greater than the size of data output to the host 102, so that it may be determined that read operation performance becomes lower. Therefore, in order to improve the read operation performance, the size of the RLA cache capable of storing data which is frequently requested data from the host 102 and pre-fetched through the RLA operation should be increased. In order to determine how much to increase the size of the RLA cache, a size of differential data can be calculated based on a difference between the reference time (t) and the update cycle (t') of the submission queue tail doorbell SQTDBL. Here, the size of the differential data is a first size of data corresponding to the difference between the reference time (t) as a preset time and the update cycle (t') of the submission queue tail doorbell SQTDBL, when a chunk size or a data size corresponding to a single command generated from the host 102 is constant. Alternatively, the size of the differential data means a second size of data corresponding to an amount of change between the reference time (t) and the update cycle (t') of the submission queue tail doorbell SQTDBL. When the chunk size or the data size corresponding to the command issued from the host 102 is constant, the chunk size or the data size requested during an interval of the reference time (t), at which the submission queue tail doorbell SQTDBL is updated, can be compared with the chunk size or the data size requested during the update cycle (t') of a current submission queue tail doorbell SQTDBL. As a comparison result, it is possible to recognize how much the chunk size or the data size corresponding to the command generated by the host 102 increases or decreases per unit time.

Further, the cache size manager 300 may increase the size of the RLA cache by a value corresponding to the size of the differential data, with reference to a RLA cache size determination coefficient table. Herein, the RLA cache size determination coefficient table is a sort of table including plural predetermined values (e.g., change values) regarding the size of the RLA cache according to size ranges of the differential data. Accordingly, the size of the RLA cache can be changed by a value selected among the plural predetermined values according to the size of the differential data. For example, when the size of the differential data belongs to a first size range (e.g., 4 KB to 16 KB) of the differential data, the size of the RLA cache can be increased by a first predetermined value. A second size range (e.g., 17 KB to 32 KB) of the differential data can correspond to a second predetermined value, and a third size range (e.g., 33 KB to 64 KB) of the differential data size range can correspond to a third predetermined value. According to an embodiment, the first to third predetermined values may be different from, or the same as, each other.

The cache size manager 300 can compare the update cycle (t') of the submission queue tail doorbell SQTDBL with the reference time (t). As a result, when the update cycle (t') of the submission queue tail doorbell SQTDBL is greater than the reference time (t) (t'>t), the cache size manager 300 can recognize that the size of the data output to the host 102 is greater than the size of data requested from the host 102, so that it is determined that the normal read performance is sufficiently high. In this case, it might not be necessary that the controller 130 generates a RLA request and transfers the RLA request to the memory device 150. Accordingly, the controller 130 can determine to reduce the size of the RLA cache. As described above, after calculating the size of the differential data based on a difference between the reference time (t) and the update cycle (t') of the submission queue tail doorbell SQTDBL, the cache size manager 300 can search for a predetermined value corresponding to the size of the differential data size in the RLA cache size determination coefficient table, in order to decrease the size of the RLA cache by a searched value.

The cache size manager 300 can compare the update cycle (t') of the submission queue tail doorbell SQTDBL with the reference time (t). As a result, when the update cycle (t') of the submission queue tail doorbell SQTDBL is equal to the reference time (t), (t'=t), the read performance is balanced (e.g., effectively enough), so that the size of the RLA cache is not changed (e.g., changing the size of the RLA cache might be not necessary).

Therefore, except for the case where the update cycle (t') of the submission queue tail doorbell SQTDBL is equal to the reference time (t), the size of the RLA cache can be changed (i.e., increased or decreased).

In an embodiment, the cache size manager 300 can further calculate the size of the RLA cache based on a difference between the submission queue head doorbell SQHDBL and the submission queue tail doorbell SQTDBL. Herein, the calculated size of the RLA cache can be an additionally applicable value to the previously calculated size of the RLA cache. For example, the cache size manager 300 can primarily determine the size change of the RLA cache based on a comparison result of the update cycle (t') and the reference time (t) and secondarily determine an additional change or adjustment of the RLA cache based on the difference between the submission queue head doorbell SQHDBL and the submission queue tail doorbell SQTDBL.

The cache size manager 300 can compare a current difference (Diff1) between the submission queue tail doorbell SQTDBL stored in the first register 201 and the submission queue head doorbell SQHDBL stored in the second register 202 with a previously calculated difference value (Diff2), to determine whether the number of commands to be processed by the memory system 110 is increasing or decreasing. That is, even if the memory system 110 receives the submission queue tail doorbell SQTDBL from the host 102, the memory system 110 can fetch a command from the submission queue SQ of the host 102 according to the read performance, so that a difference between the submission queue tail doorbell SQTDBL and the submission queue head doorbell SQHDBL can be varied. Therefore, as a result of comparing the current difference (Diff1) between the submission queue tail doorbell SQTDBL and the submission queue head doorbell SQHDBL stored in the second register 202 and the previous difference value (Diff2), it can be recognized whether the number of commands to be processed by the memory system 110 is increasing or decreasing. The cache size manager 300 can determine the necessity to change the size of the RLA cache. In addition, after calculating the size of the differential data based on an amount of change in differences between the submission queue head doorbell SQHDBL and the submission queue tail doorbell SQTDBL, the size of the RLA cache may be changed based on a value corresponding to the size of the differential data. For example, the cache size manager 300 can recognize that the number of commands to be fetched and processed by the memory system 110 from the host 102 is increasing when the current difference Diff1 between the submission queue head doorbell SQHDBL and the submission queue tail doorbell SQTDBL is greater than the previous difference value Diff2 (Diff1>Diff2). That is, the increase in the number of commands to be fetched and processed by the memory system 110 may indicate that command processing is being delayed in the memory system 110, so that the read performance becomes lower. Therefore, the size of the RLA cache should be increased in order to quickly fetch and process pending commands. The cache size manager 300 can check the number of delayed commands per unit time based on the current difference (Diff1) between the submission queue head doorbell SQHDBL and the submission queue tail doorbell SQTDBL and the previous difference value (Diff2), to determine how many commands have been delayed per unit time and calculate the size of the differential data through the number of commands. In addition, the cache size manager 300 may select a value corresponding to the size of the differential data in the RLA cache size determination coefficient table and increase the size of the RLA cache by the selected value. That is, the cache size manager 300 can further adjust or change the size of the RLA cache by a value corresponding to the size of the differential data based on the calculated size of the RLA cache.

On the other hand, the cache size manager 300 can determine to reduce the size of the RLA cache when the current difference (Diff1) between the submission queue head doorbell SQHDBL and the submission queue tail doorbell SQTDBL is less than the previous difference value (Diff2) (Diff1<Diff2). Because the number of commands to be fetched from the host 102 and processed by the memory system 110 is decreasing, it can be determined that the number of requests for data cached in the RLA cache by the host 102 would decrease. Accordingly, the size of the RLA cache needs to be reduced. The cache size manager 300 can recognize the number of commands decreasing per unit time through a difference change in the current difference (Diff1) and the previous difference value (Diff2) between the submission queue head doorbell SQHDBL and the submission queue tail doorbell SQTDBL, and determine the decreased size of the differential data based on the decreased number of commands. Then, the cache size manager 300 can search for a size value corresponding to the decreased size of the differential data in the RLA cache size determination coefficient table, and then additionally reduces the size of the RLA cache by a searched size value.

After the cache size manager 300 can set the size of the RLA cache calculated based on the update cycle (t') of the submission queue tail doorbell SQTDBL and the amount of change in the current and previous differences between the submission queue head doorbell SQHDBL and the submission queue tail doorbell SQTDBL, the cache size manger 300 can check whether the size of the RLA cache exceeds a RLA cache maximum size (Max). Here, the maximum size (Max) is the maximum size in an allowable size range for the RLA cache, as the size of the second read cache 402. As a checking result, if the calculated size of the RLA cache is less than the maximum size (Max), the size of the RLA cache can be changed with the calculated size.

On the other hand, when the calculated size of the RLA cache exceeds the maximum size (Max), the RLA cache, which is at least some area allocated for the RLA operation in the second read cache 402, could be released. That is, the RLA cache can be adjusted according to read commands generated by the host 102. In a situation where the number of read commands generated from the host gradually increases, overheads for maintaining the RLA cache and processing RLA cache hits could be greater than that for performing read operations. Accordingly, the second read cache 402, the RLA cache, which is an area allocated for the RLA operation, may be released. Therefore, the area for the RLA cache is converted to set as an area for storing data obtained through the read operations, not the RLA operation.

Figure 5:
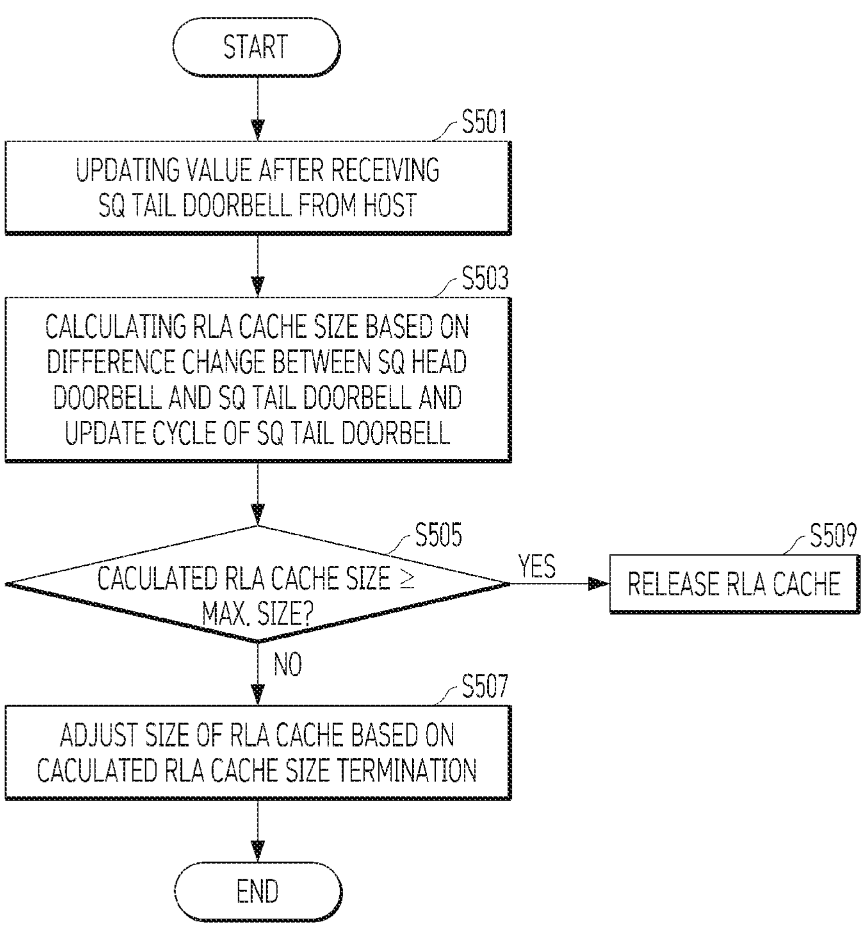
FIG. 5 illustrates a method for adjusting a size of RLA cache according to an embodiment of the present disclosure.

FIG. 5 illustrates a method for adjusting a size of RLA cache according to an embodiment of the present disclosure.

Referring to FIG. 5, in operation S501, the controller 130 can receive a submission queue tail doorbell SQTDBL from the host 102. The submission queue tail doorbell SQTDBL is a type of message used for notifying the memory system 110 that at least one command to be transmitted to the memory system 110 has occurred by the host 102. The submission queue tail doorbell SQTDBL can include slot information regarding the at least one command (e.g., queue entry) queued in the submission queue SQ. That is, upon receiving the submission queue tail doorbell SQTDBL from the host 102, the controller 130 may change an existing submission queue tail doorbell SQTDBL to the latest submission queue tail doorbell SQTDBL.

In operation S503, the controller 130 can use the update interval (t') of the submission queue tail doorbell SQTDBL and the difference between the submission queue head doorbell SQHDBL and the submission queue tail doorbell SQTDBL to calculate the size of the RLA cache. In this regard, it will be described in detail with reference to FIG. 6.

In operation S505, the controller 130 can check whether the size of the RLA cache exceeds the maximum size (Max), after calculating the size of the RLA cache based on the submission queue tail doorbell SQTDBL update cycle (t') and the difference change between the submission queue head doorbell SQHDBL and the submission queue tail doorbell SQTDBL. Herein, the maximum size (Max) is the maximum size in an allowable size range for the RLA cache, as the size of the second read cache 402.

As a result of the check, if the calculated size of the RLA cache does not exceed the maximum size (Max) ('NO' in the operation S505), the size of the RLA cache is changed to the calculated size (operation S507).

On the other hand, if the calculated size of the RLA cache exceeds the maximum size (Max) ('YES' in the operation S505), the RLA cache, which is an area allocated for the RLA operation in the second read cache 402, could be released (operation S509). That is, the RLA cache can be adjusted according to the read commands generated by the host 102. In a situation where the number of read commands generated by the host 102 gradually increases, the overheads for checking whether pre-fetched data in the RLA cache is hit may be greater than that for performing read operations. Accordingly, the RLA cache, which is an area allocated for the RLA operation in the second read cache 402, could be released.

Figure 6:
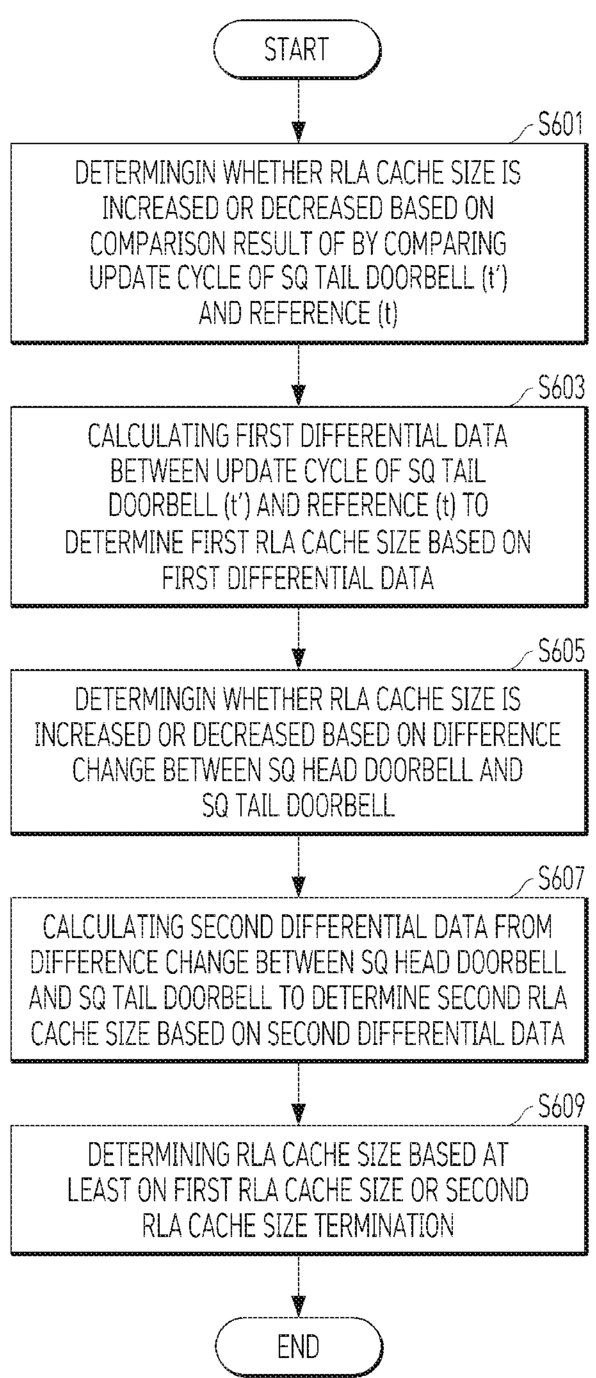
FIG. 6 illustrates a method for calculating a size of RLA cache according to an embodiment of the present disclosure.

FIG. 6 illustrates a method for calculating a size of RLA cache according to an embodiment of the present disclosure.

Referring to FIGS. 1 to 6, in the embodiments of the present invention, after comparing the update cycle (t') of the submission queue tail doorbell SQTDBL and the reference time (t), the size of the RLA cache can be calculated based on the difference change between the submission queue head doorbell SQHDBL and the submission queue tail doorbell SQTDBL, and submission. However, in another embodiment, after calculating the size of the RLA cache based on the difference change, the size of the RLA cache could be further adjusted based on a comparison result of the update cycle (t') of the submission queue tail doorbell SQTDBL and the reference time (t). An order of calculations for changing or adjusting the size of the RLA cache can be changed according to an embodiment.

Referring to FIG. 6, the controller 130 can calculate the size of the RLA cache based on the difference between the update cycle (t') of the submission queue tail doorbell SQTDBL and the reference time (t) (e.g., a first calculation operation regarding a RLA cache size). Further, the controller 130 can calculate the size of the RLA cache based on the change in the current and previous differences between the submission queue head doorbell SQHDBL and the submission queue tail doorbell SQTDBL (e.g., a second calculation operation regarding the RLA cache size).

Specifically, in operation S601, the controller 130 may determine whether to increase or decrease the size of the RLA cache based on a result of comparing the update cycle (t') of the submission queue tail doorbell SQTDBL with the reference time (t) (See FIG. 3). For example, when the update cycle (t') of the submission queue tail doorbell SQTDBL is less than the reference time (t) (t'<t), a size of data output to the host 102 is greater than a size corresponding to a request input from the host 102. Because the size of the data output to the host 102 is greater than the size corresponding to the request, the controller 130 can determine that the read operation performance becomes lower. Thus, the controller 130 may determine to increase the size of the RLA cache capable of temporarily storing data which is estimated to be frequently requested by the host 102 and obtained through the RLA operation. On the other hand, the cache size manager 300 can compare the update cycle (t') of the submission queue tail doorbell SQTDBL with the reference time (t). As a result, when the update cycle (t') of the submission queue tail doorbell SQTDBL is greater than the reference time (t') (t'>t), the controller 130 can recognize that the size of data output to the host 102 is greater than the size of data corresponding to a request input from the host 102, so that the read operation performance is sufficiently high. In this case, the RLA request might not be necessary to pre-fetch data stored in the memory device 150. Accordingly, the controller 130 may determine to reduce the size of the RLA cache.

Furthermore, when updating the submission queue tail doorbell SQTDBL input from the host 102 at intervals equal to the reference time (t), the size of the RLA cache may not be changed because the read operation performance is sufficiently enough (e.g., changing the size of the RLA cache is not necessary to improve I/O throughput of the memory system 110).

Therefore, when the update cycle (t') of the submission queue tail doorbell SQTDBL is not the same as the reference time (t), the controller 130 can determine to change (i.e., increase or decrease) the size of the RLA cache.

In operation S603, the controller 130 can calculate the size of the differential data based on the difference between the update cycle (t') of the submission queue tail doorbell SQTDBL and the reference time (t), and then calculate the size of the RLA cache based on the size of the differential data. Specifically, the controller 130 can search for a value corresponding to the size of the differential data in the RLA cache size determination coefficient table. Herein, the RLA cache size determination coefficient table is a sort of table including predetermined size values assigned for different size ranges of the differential data. Accordingly, the controller 130 may perform the first calculation operation regarding the RLA cache size by changing or adjusting the size of the RLA cache with an increased or decreased value corresponding to the size of the differential data.

In operation S605, the controller 130 can determine whether to increase or decrease the size of the RLA cache based on the current difference (Diff1) between the submission queue head doorbell SQHDBL and the submission queue tail doorbell SQTDBL and the previous difference value (Diff2). Specifically, the controller 130 can recognize that the number of commands to be fetched and processed by the controller 130 is increasing when the current difference (Diff1) between the submission queue head doorbell SQHDBL and the submission queue tail doorbell SQTDBL is greater than the previous difference value (Diff2) (Diff1>Diff2). Accordingly, the controller 130 can determine to increase the size of the RLA cache. That is, the increase in the number of commands to be fetched and processed by the controller 130 means that command processing has been delayed, which indicates that the read performance becomes lower or worse. Therefore, in order to improve the read performance, it is necessary to increase the size of the RLA cache so that delayed commands could be more quickly processed.

On the other hand, if the current difference (Diff1) between the submission queue head doorbell SQHDBL and the submission queue tail doorbell SQTDBL is less than the previous difference (Diff2) (Diff1<Diff2), the controller 130 can recognize that the number of commands to be fetched and processed by the controller 130 is decreasing. Accordingly, the controller 130 can determine to reduce the size of the RLA cache.

In operation S607, the controller 130 can determine whether to increase or decrease the size of the RLA cache, check the number of delayed commands per time unit based on the difference change between the current difference (Diff1) and the previous difference (Diff2) regarding the submission queue head doorbell SQHDBL and the submission queue tail doorbell SQTDBL, and determine the size of the differential data based on a checked number of delayed commands. In addition, the controller 130 may select a value corresponding to the size of the differential data in the RLA cache size determination coefficient table, and then may increase or decrease the size of the RLA cache by the selected value (the second calculation operation regarding the RLA cache size). In an embodiment, the size of the RLA cache calculated though the second calculation operation could be applicable as an additional adjustment for the size of the RLA cache calculated through the first calculation operation.

In operation S609, the controller 130 can determine the size of the RLA cache calculated through operations S601 to S607 as a final size used for changing or adjusting the size of the RLA cache.

As mentioned above, in another embodiment, the method for changing or adjusting the size of the RLA cache includes changing the size of the RLA cache based on the change in the differences between the submission queue head doorbell SQHDBL and the submission queue tail doorbell SQTDBL, and then additionally changing the size of the RLA cache based on the update cycle of the submission queue tail doorbell SQTDBL.

As above described, a memory system according to an embodiment of the present invention can change or adjust a size of RLA cache for storing pre-fetched data during the RLA operation based on a change in the update cycle of the submission queue tail doorbell SQTDBL, input from the host, and/or the difference between the submission queue head doorbell SQHDBL and the submission queue tail doorbell SQTDBL. The memory system can optimize throughput of the RLA based on a command issue speed of the host.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods or operations of the computer, processor, controller, or other signal processing device, are described in detail, the code or instructions for implementing the operations of the method embodiments may transform the computer, processor, controller, or other signal processing device into a special-purpose processor for performing the methods herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments herein.

The controllers, processors, control circuitry, devices, modules, units, multiplexers, generators, logic, interfaces, decoders, drivers, generators and other signal generating and signal processing features of the embodiments disclosed herein may be implemented, for example, in non-transitory logic that may include hardware, software, or both. When implemented at least partially in hardware, the controllers, processors, control circuitry, devices, modules, units, multiplexers, generators, logic, interfaces, decoders, drivers, generators and other signal generating and signal processing features may be, for example, any of a variety of integrated circuits including but not limited to an application-specific integrated circuit, a field-programmable gate array, a combination of logic gates, a system-on-chip, a microprocessor, or another type of processing or control circuit.

When implemented at least partially in software, the controllers, processors, control circuitry, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods or operations of the computer, processor, microprocessor, controller, or other signal processing device, are described in detail, the code or instructions for implementing the operations of the method embodiments may transform the computer, processor, controller, or other signal processing device into a special-purpose processor for performing the methods described herein.

While the present teachings have been illustrated and described with respect to the specific embodiments, it will be apparent to those skilled in the art in light of the present disclosure that various changes and modifications may be made without departing from the spirit and scope of the disclosure as defined in the following claims. Furthermore, the embodiments may be combined to form additional embodiments.

What is claimed is:

1. A controller, comprising:

at least one register configured to store a doorbell regarding a submission queue for at least one request generated by a host;

a read cache including a first area and a second area, wherein the first area is allocated to store data corresponding to the at least one request and at least a part of the second area is allocated to store data corresponding to a read look ahead (RLA) request generated based on the at least one request; and a cache size manager configured to determine a cache size for the RLA request based on an update cycle of the doorbell and adjust a size of the at least part of the second area allocated for the RLA request based on the determined cache size.

2. The controller of claim 1, wherein, when the determined cache size for the RLA request exceeds the second area, the cache size manager releases at least some cache area allocated for the RLA request.

3. The controller of claim 1, wherein the cache size manager determines to increase the cache size for the RLA request when the update cycle of the doorbell is less than a reference time.

4. The controller of claim 3, wherein the doorbell comprises at least one of a submission queue head doorbell and a submission queue tail doorbell.

5. The controller of claim 1, wherein a size of the first area is initially set to a default size.

6. The controller of claim 1, wherein the cache size manager determines the cache size for the RLA request within a size of the second area.

7. A controller, comprising:

at least one register configured to store a doorbell regarding a submission queue for at least one request generated by a host;

a read cache including a default area for an operation performed in response to the at least one request and a variable area for an operation performed in response to a read look ahead (RLA) request generated based on the at least one request; and a cache size manager configured to determine a cache size for the RLA request based on an update cycle of the doorbell and adjust a size of the variable area allocated for the RLA request based on the determined cache size.

8. The controller of claim 7, wherein, when the determined cache size for the RLA request exceeds a predetermined size, the cache size manager releases at least some cache area for the RLA request in the read cache.

9. The controller of claim 7, wherein the cache size manager determines to increase the cache size for the RLA request when the update cycle of the doorbell is less than a reference time.

10. The controller of claim 7, wherein the cache size manager adjust the size of the variable area allocated for the RLA request within a predetermined size.

11. The controller of claim 7, wherein a size of the default area is initially set to a preset size.

12. A controller, comprising:

a plurality of registers configured to store a submission queue head doorbell and a submission queue tail doorbell regarding a plurality of requests generated by a host;

a read cache including a first area and a second area, wherein the first area is configured to store data corresponding to the plurality of requests, and at least a part of the second area is allocated to store data corresponding to a read look ahead (RLA) request generated based on the plurality of requests; and a cache size manager configured to determine a cache size for the RLA request based on a difference of the submission queue head doorbell and the submission queue tail doorbell and adjust a size of the at least part of the second area allocated for the RLA request based on the determined cache size.

13. The controller of claim 12, wherein, when the difference of the submission queue head doorbell and the submission queue tail doorbell increases, the cache size manager determines to increase the cache size for the RLA request.

14. The controller of claim 12, wherein, when the determined cache size for the RLA request exceeds the second area, the cache size manager releases the at least part of the second area allocated for the RLA request.

15. The controller of claim 12, wherein a size of the first area is initially set to a default size.

16. The controller of claim 12, wherein the cache size manager determines the cache size for the RLA request within a size of the second area.

17. A method for operating a memory system, comprising:

storing a doorbell regarding a submission queue storing at least one request generated by a host;

storing first data read from a non-volatile memory corresponding to the at least one request in a default area of a read cache;

generating a read look ahead (RLA) request based on the at least one request;

storing second data read from the non-volatile memory corresponding to the RLA request in a variable area allocated for the RLA request in the read cache;

determining a cache size for the RLA request based on an update cycle of the doorbell; and adjusting a size of the variable area based on the determined cache size for changing an operation throughput of the RLA request.

18. The method of claim 17, further comprising:

when the determined cache size for the RLA request exceeds a predetermined size, releasing at least some cache area for the RLA request in the read cache.

19. The method of claim 17, further comprising:

determining to increase the cache size for the RLA request when the update cycle of the doorbell is less than a reference time.

20. The method of claim 19, wherein the doorbell comprises at least one of a submission queue head doorbell and a submission queue tail doorbell.

21. A memory system, comprising:

a non-volatile memory for storing data;

at least one register configured to store a doorbell regarding a submission queue for at least one request generated by a host;

a read cache including a first area and a second area, wherein the first area is allocated to store first data, read from the non-volatile memory corresponding to the at least one request, and at least some part of the second area is allocated to store second data read from the non-volatile memory corresponding to a read look ahead (RLA) request generated based on the at least one request; and a cache size manager configured to determine a cache size for the RLA request based on a read performance of the memory system and adjust a size of the at least some part of the second area allocated for the RLA request based on the determined cache size.

22. The memory system of claim 21, wherein the cache size manager determines the read performance of the memory system based on an update cycle of the doorbell.

23. The memory system of claim 21, wherein the cache size manager determines to increase the cache size for the RLA request when the update cycle of the doorbell is less than a reference time.

24. The memory system of claim 23, wherein the doorbell comprises at least one of a submission queue head doorbell and a submission queue tail doorbell.

25. The memory system of claim 21, wherein, when the determined cache size for the RLA request exceeds the second area, the cache size manager releases at least some of the cache area allocated for the RLA request.

26. The memory system of claim 21, wherein a size of the first area is initially set to a default size.

27. The memory system of claim 21, wherein the cache size manager determines the cache size for the RLA request within a size of the second area.

* * * * *